United States Patent
Hoban et al.

(10) Patent No.: US 9,563,412 B2
(45) Date of Patent: Feb. 7, 2017

(54) STATICALLY EXTENSIBLE TYPES

(71) Applicant: MICROSOFT TECHNOLOGY LICENSING, LLC, Redmond, WA (US)

(72) Inventors: Lucas J. Hoban, Seattle, WA (US); Mads Torgersen, Issaquah, WA (US); Charles P. Jazdzewski, Redmond, WA (US); Anders Hejlsberg, Seattle, WA (US); Steven E. Lucco, Bellevue, WA (US); Joseph J. Pamer, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 78 days.

(21) Appl. No.: 13/798,095

(22) Filed: Mar. 13, 2013

(65) Prior Publication Data
US 2014/0282442 A1    Sep. 18, 2014

(51) Int. Cl.
*G06F 9/44* (2006.01)
*G06F 9/45* (2006.01)

(52) U.S. Cl.
CPC .............. *G06F 8/437* (2013.01); *G06F 8/10* (2013.01)

(58) Field of Classification Search
CPC ............ G06F 17/30286; G06F 17/30604; G06F 8/433; G06F 8/437; G06F 9/4431; G06F 8/10; G06F 8/41
See application file for complete search history.

(56) References Cited

U.S. PATENT DOCUMENTS

| | | |
|---|---|---|
| 5,586,328 A | 12/1996 | Caron et al. |
| 6,083,282 A | 7/2000 | Caron et al. |
| 6,195,792 B1 | 2/2001 | Turnbull et al. |

(Continued)

FOREIGN PATENT DOCUMENTS

| | | |
|---|---|---|
| EP | 2096534 A1 | 9/2009 |
| EP | 2141587 A1 | 1/2010 |

OTHER PUBLICATIONS

Nicholas C. Zakas, Thoughts on TypeScript; 2012; 11 page; <http://www.nczonline.net/blog/2012/10/04/thoughts-on-typescript/>.*

(Continued)

*Primary Examiner* — Thuy Dao
*Assistant Examiner* — Cuong V Luu
(74) *Attorney, Agent, or Firm* — Kevin Sullivan; Kate Drakos; Micky Minhas

(57) ABSTRACT

Statically extensible types allow a static type system to model the behavior of dynamic object model extension in dynamic runtime systems. Static types that model dynamically extended types can be extended using additional declarations in the same compilation. Declarations for a particular type can come from multiple independent sources which can have been defined at multiple points in time. Extension declarations can use the same syntax as the initial type declaration. Hence presence of one or more declarations for the same type in a compilation can indicate that the type has been extended. These features allow static type checking of dynamic plug-ins to be supported using statically extensible types. Declarations and extension declarations for a type can be merged together to create an extended type that enables different processing paths and dependencies.

20 Claims, 5 Drawing Sheets

(56) References Cited

U.S. PATENT DOCUMENTS

| | | | |
|---|---|---|---|
| 6,381,736 | B1 | 4/2002 | Klotz et al. |
| 6,941,550 | B1* | 9/2005 | Sollich ................ G06F 8/24 717/166 |
| 7,237,226 | B2 | 6/2007 | Simonyi |
| 7,350,198 | B2 | 3/2008 | Kluger et al. |
| 7,523,443 | B2 | 4/2009 | DeVane |
| 7,730,448 | B2 | 6/2010 | Meijer et al. |
| 8,122,440 | B1 | 2/2012 | Lentini et al. |
| 8,250,528 | B2 | 8/2012 | Meijer et al. |
| 8,332,385 | B2 | 12/2012 | Moor et al. |
| 8,473,897 | B2* | 6/2013 | Box et al. ................ 717/106 |
| 8,713,528 | B1 | 4/2014 | Conrad et al. |
| 2002/0100033 | A1 | 7/2002 | Halstead et al. |
| 2003/0159057 | A1* | 8/2003 | Mangold ............. G06F 21/10 713/193 |
| 2003/0167458 | A1 | 9/2003 | Santhanam et al. |
| 2003/0208605 | A1 | 11/2003 | Vu |
| 2004/0210869 | A1 | 10/2004 | DeVane |
| 2004/0225964 | A1 | 11/2004 | Simonyi |
| 2005/0097533 | A1* | 5/2005 | Chakrabarti .......... G06F 8/4443 717/144 |
| 2006/0048095 | A1 | 3/2006 | Meijer et al. |
| 2006/0150146 | A1* | 7/2006 | Meijer ................ G06F 9/4433 717/108 |
| 2006/0242115 | A1 | 10/2006 | Baras et al. |
| 2006/0259541 | A1* | 11/2006 | Bernabeu-Auban .... G06F 9/465 709/202 |
| 2007/0028223 | A1* | 2/2007 | Meijer ................... G06F 8/427 717/140 |
| 2007/0083551 | A1 | 4/2007 | Jezierski et al. |
| 2007/0245325 | A1 | 10/2007 | Lapounov et al. |
| 2008/0215520 | A1* | 9/2008 | Gu ................... G06F 17/30911 706/48 |
| 2008/0282238 | A1 | 11/2008 | Meijer et al. |
| 2009/0187882 | A1 | 7/2009 | Jazdzewski |
| 2009/0313613 | A1 | 12/2009 | Ben-Artzi et al. |
| 2009/0319554 | A1* | 12/2009 | Krishnaswamy et al. .... 707/102 |
| 2010/0023486 | A1 | 1/2010 | Baras et al. |
| 2010/0088661 | A1 | 4/2010 | Langworthy et al. |
| 2010/0088665 | A1 | 4/2010 | Langworthy et al. |
| 2010/0088666 | A1* | 4/2010 | Box .......................... G06F 8/42 717/104 |
| 2010/0088674 | A1 | 4/2010 | Della-Libera et al. |
| 2010/0169868 | A1* | 7/2010 | Condit .................... G06F 8/437 717/136 |
| 2010/0211924 | A1 | 8/2010 | Begel et al. |
| 2010/0299660 | A1 | 11/2010 | Torgersen et al. |
| 2011/0167404 | A1 | 7/2011 | Liu et al. |
| 2011/0258593 | A1* | 10/2011 | Ng .......................... G06F 8/437 717/106 |
| 2011/0276950 | A1* | 11/2011 | Fisher .................... G06F 8/437 717/140 |
| 2012/0137367 | A1* | 5/2012 | Dupont .................. G06F 21/00 726/25 |
| 2012/0151495 | A1* | 6/2012 | Burckhardt ............ G06F 9/485 718/106 |
| 2012/0215731 | A1 | 8/2012 | Junker |
| 2014/0130016 | A1 | 5/2014 | Menghrajani et al. |

OTHER PUBLICATIONS

Cormac Flanagan; Extended Static Checking for Java; 2002 ACM; pp. 22-33; <http://dl.acm.org/citation.cfm?id=2502520>.*

George C. Necula; CCured Type-Safe Retrofitting of Legacy Code; 2002 ACM; pp. 128-139; <http://dl.acm.org/citation.cfm?id=503286>.*

AL BesseY; A few Billion Lines of code Later using static Analysis to find Bugs in the Real World; 2010 ACM; pp. 66-75; <http://dl.acm.org/citation.cfm?id=1646374>.*

Dawson Engler; Checking System Rules Using System-Specific, Programmer-Written Compiler Extensions; 2000 ACM; 16 pages; <http://dl.acm.org/citation.cfm?id=1251230>.*

Seth Hallem; A System and Language for Building System-Specific, Static Analyses; 2002 ACM; pp. 69-82; <http://dl.acm.org/citation.cfm?id=512539>.*

John Viega; ITS4 A Static Vulnerability Scanner for C and C++ Code; 2000 IEEE; pp. 257-267; <http://ieeexplore.ieee.org/stamp/stamp.jsp?arnumber=898880>.*

Yao-Wen Huang et al.; Securing Web Application Code by Static Analysis and Runtime Protection; 2004 ACM; pp. 40-51; <http://dl.acm.org/citation.cfm?id=988679>.*

Tim Sheard et al.; Template Meta-programming for Haskell; 2002 ACM; 16 pages; <http://dl.acm.org/citation.cfm?id=581691>.*

Craig Chambers et al.; Customization Optimizing Compiler Technology for SELF a Dynamically-Typed Object-Oriented Programming Language; 1989 ACM; pp. 146-160; <http://dl.acm.org/citation.cfm?id=74831>.*

Michael Furr et al.; Static Type Inference for Ruby; 2009 ACM; pp. 1859-1866; <http://dl.acm.org/citation.cfm?id=1529700>.*

Andrew C. Myers; JFlow Practical Mostly-Static Information Flow Control; 1999 ACM; pp. 228-241; <http://dl.acm.org/citation.cfm?id=292561>.*

Chandrasekhar Boyapati; Ownership Types for Safe Programming Preventing Data Races and Deadlocks; 2002 ACM; pp. 211-230; <http://dl.acm.org/citation.cfm?id=582440>.*

Haldiman, et al.,"Practical, Pluggable Types for a Dynamic Language", Retrieved at <<http://scg.unibe.ch/archive/papers/Hald08aTypeplug.pdf>>, Computer Languages, Systems & Structures, vol. 35, Issue.1, Apr. 2009, pp. 48-64.

Wyk, et al., "Adding Syntax and Static Analysis to Libraries via Extensible Compilers and Language Extensions", Retrieved at <<http://www.msse.umn.edu/system/files/publications/vanwyk_lcsd.pdf>>, Library-Centric Software Design, Oct. 22, 2006, pp. 35-44.

Barnes, et al., "On the Principled Design of Object Oriented Programming Languages for High Integrity Systems", Retrieved at <<http://citeseerx.ist.psu.edu/viewdoc/download?doi=10.1.1.92.9359&rep=rep1&type=pdf>>, 2nd NASA/FAA Object Oriented Technology in Aviation Workshop, Retrieved Date : Jan. 2002, pp. 1-12.

Paige, et al., "Specification-Driven Development of an Executable Metamodel in Eiffel", Retrieved at http://citeseerx.ist.psu.edu/viewdoc/download?doi=10.1.1.67.2891&rep=rep1&type=pdf>>, Essentials of the 3rd UML Workshop in Software Model Engineering, Oct. 11, 2004, pp. 1-8.

Saraswat, et al., "Constrained Types for Object-Oriented Languages", Retrieved at <<http://grothoff.org/christian/oopsla2008.pdf>>, ACM SIGPLAN Conference on Object-Oriented Programming, Systems, Languages, and Applications, Oct. 19, 2008, pp. 457-474.

Bayne, et al., "Always-Available Static and Dynamic Feedback", Retrieved at <<http://homes.cs.washington.edu/~mernst/pubs/ductile-icse2011.pdf>>, 33rd International Conference on Software Engineering, May 21, 2011, pp. 521-530.

"Announcing TypeScript 0.8.1", Retrieved From <<https://blogs.msdn.microsoft.com/typescript/2012/11/15/announcing-typescript-0-8-1/>>, Nov. 15, 2012, 3 pages.

"C# Type Inference", Retrieved From <<http://web.archive.org/web/20101214040936/http://codersource.net/microsoft-net/c-net-3-0/c-type-inference.aspx>>, Nov. 5, 2012, 4 Pages.

"Technical Overview", Retrieved From <<http://web.archive.org/web/20131002191415/https://www.darling.org/docs/technical-overview/>>, Nov. 5, 2012, 6 Pages.

"TypeScript: Language Specification, Version 0.8", Retrieved From <<http://web.archive.org/web/20121011070203/http://www.typescriptlang.org/Content/TypeScript%20Language%20Specification.pdf>>, Oct. 2012, pp. 1-97.

"Final Rejection Issued in U.S. Appl. No. 13/798,088", Mailed Date: Mar. 19, 2015, 25 Pages.

"Final Rejection Issued in U.S. Appl. No. 13/798,088", Mailed Date: Jun. 3, 2016, 19 Pages.

"Non-Final Rejection Issued in U.S. Appl. No. 13/798,088", Mailed Date: Oct. 4, 2016, 19 Pages.

"Non-Final Rejection Issued in U.S. Appl. No. 13/798,088", Mailed Date: Aug. 20, 2015, 16 Pages.

(56) References Cited

OTHER PUBLICATIONS

"Non-Final Rejection Issued in U.S. Appl. No. 13/798,088", Mailed Date: Jan. 22, 2016, 17 Pages.
"Non-Final Rejection Issued in U.S. Appl. No. 13/798,088", Mailed Date: Nov. 13, 2014, 17 Pages.
"Final Rejection Issued in U.S. Appl. No. 13/798,100", Mailed Date: Mar. 17, 2016, 22 Pages.
"Final Rejection Issued in U.S. Appl. No. 13/798,100", Mailed Date: Apr. 7, 2015, 27 Pages
"Non-Final Rejection Issued in U.S. Appl. No. 13/798,100", Mailed Date Nov. 20, 2015, 22 Pages.
"Non-Final Rejection Issued in U.S. Appl. No. 13/798,100", Mailed Date: Sep. 18, 2014, 26 Pages.
"Non-Final Rejection Issued in U.S. Appl. No. 13/798,100", Mailed Date: Jul. 29, 2016, 22 Pages.
"Final Rejection Issued in U.S. Appl. No. 13/798,107", Mailed Date: Mar. 6, 2015, 32 Pages.
"Final Rejection Issued in U.S. Appl. No. 13/798,107", Mailed Date: Nov. 27, 2015, 26 Pages.
"Non-Final Rejection Issued in U.S. Appl. No. 13/798,107", Mailed Date: Jun. 6, 2016, 22 Pages.
"Non-Final Rejection Issued in U.S. Appl. No. 13/798,107", Mailed Date: Oct. 29, 2014, 30 Pages.
"Non-Final Rejection Issued in U.S. Appl. No. 13/798,107", Mailed Date: Jul. 16, 2015, 23 Pages.
"Notice of Allowance Issued in U.S. Appl. No. 13/798,107", Mailed Date: Oct. 12, 2016, 9 Pages.
Aiken, et al., "Dynamic Typing and Subtype Inference", In Seventh International Conference on Functional programming Languages and Computer Architecture, Jun. 26, 1995, pp. 182-191.
Amadio, Roberto M., "Subtyping Recursive Types", In Proceedings of the 18th ACM SIGPLAN-SIGACT Symposium on Principles of Programming Languages, Jan. 3, 1991, pp. 104-118.
Buneman, et al., "A Query Language and Optimization Techniques for Unstructures Data", In Proceedings of the ACM SIGMOD International Conference on Management of Data, Jun. 1, 1996, pp. 505-516.
Buneman, et al., "Programming Constructs for Unstructured Data", IRCS Report 95-06, The Institute For Research In Cognitive Science, University of Pennsylvania, Mar. 1995, 12 Pages.
Esposito, Dino, "C#4.0, the Dynamic Keyword and COM", Retrieved From <<http://web.archive.org/web/20121105103245/http://msdn.microsoft.com/en-us/magazine/ff714583.aspx>>, Jun. 2010, 6 Pages.
Gundry, et al., "Type Inference in Context", In Third ACM SIGPLAN workshop on Mathematically Structured Functional Programming, Sep. 27, 2010, pp. 43-54.
Heeren, et al., "Generalizing Hindley-Milner Type Inference Algorithms", In Technical Report, Institute of Information and Computing Sciences, Jul. 8, 2002, pp. 1-28.
Hendren, L. J., "Parallelizing Programs with Recursive Data Structures", In IEEE Transactions on Parallel and Distributed Systems, vol. 1, Issue 1, Jan. 1990, pp. 35-47.
Klarlund, et al., "Graph Types", In Proceedings of the 20th ACM SIGPLAN-SIGACT Symposium on Principles of Programming Languages, Mar. 1, 1993, pp. 196-205.
Lindahl, et al., "Practical Type Inference Based on Success Typings", In Proceedings of the ACM SIGPLAN International Conference on Principles and Practice of Declarative Programming, pp. 167-178.
Reiss, Steven P., "Pecan Program Development Systems that Support Multiple Views", In IEEE Transactions on Software Engineering, vol. 11, Issue 3, Mar. 1985, pp. 276-285.

\* cited by examiner

STATICALLY EXTENSIBLE TYPES

CROSS-REFERENCE TO RELATED APPLICATIONS

The application is related in subject matter to co-pending U.S. patent application Ser. No. 13/798,088 entitled "STATIC TYPE CHECKING ACROSS MODULE UNIVERSES", filed on Mar. 13, 2013. The application is related in subject matter to co-pending U.S. patent application Ser. No. 13/798,100 entitled "CONTEXTUAL TYPING", filed on Mar. 13, 2013. The application is related in subject matter to co-pending U.S. patent application Ser. No. 13/798,107 entitled "GRAPH-BASED MODEL FOR TYPE SYSTEMS", filed on Mar. 13, 2013.

BACKGROUND

A computer program is typically composed of components that may invoke other components of the program. A program component can be associated with an interface that identifies the component and defines how the component is invoked and how and what kind of values can be passed to and from the component.

When the language used to write the program is a typed language, the interface can declare or imply one or more types for each value that can be sent to the program component. Types can be used by a type checker to make sure that passed values are of the correct type. Type checking can happen at compile time (static type checking) or at runtime (dynamic type checking). Static type checking is able to verify that the type checked conditions hold for all possible executions of the program. Dynamic type checking is performed at runtime. Dynamic type checking is only able to verify that a particular execution of a program is error-free so dynamic type checking has to be performed each time the program is run.

SUMMARY

Static types that model dynamically extended types can be extended using additional declarations in the same compilation. Declarations for a particular type can come from multiple independent sources at multiple points in time. Statically extensible interface types are static interface types which can be extended using additional interface declarations in the same compilation. Declarations for a particular interface type can come from multiple independent sources at multiple points in time.

Extension declarations are called herein static type extensions. Static type extensions can use the same syntax as the initial type declaration. Hence presence of one or more static type extensions in a compilation can indicate that a type has been extended. An extension declaration can use a syntax that is distinct from the syntax of the initial type declaration. Use of a distinct syntax can enable errors in static type extension statements to be caught while still supporting static type extension. Static type checking of dynamic plug-ins is supported using statically extensible types. Declarations and extension declarations for a type can be merged together to create an extended type that enables different processing paths and dependencies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
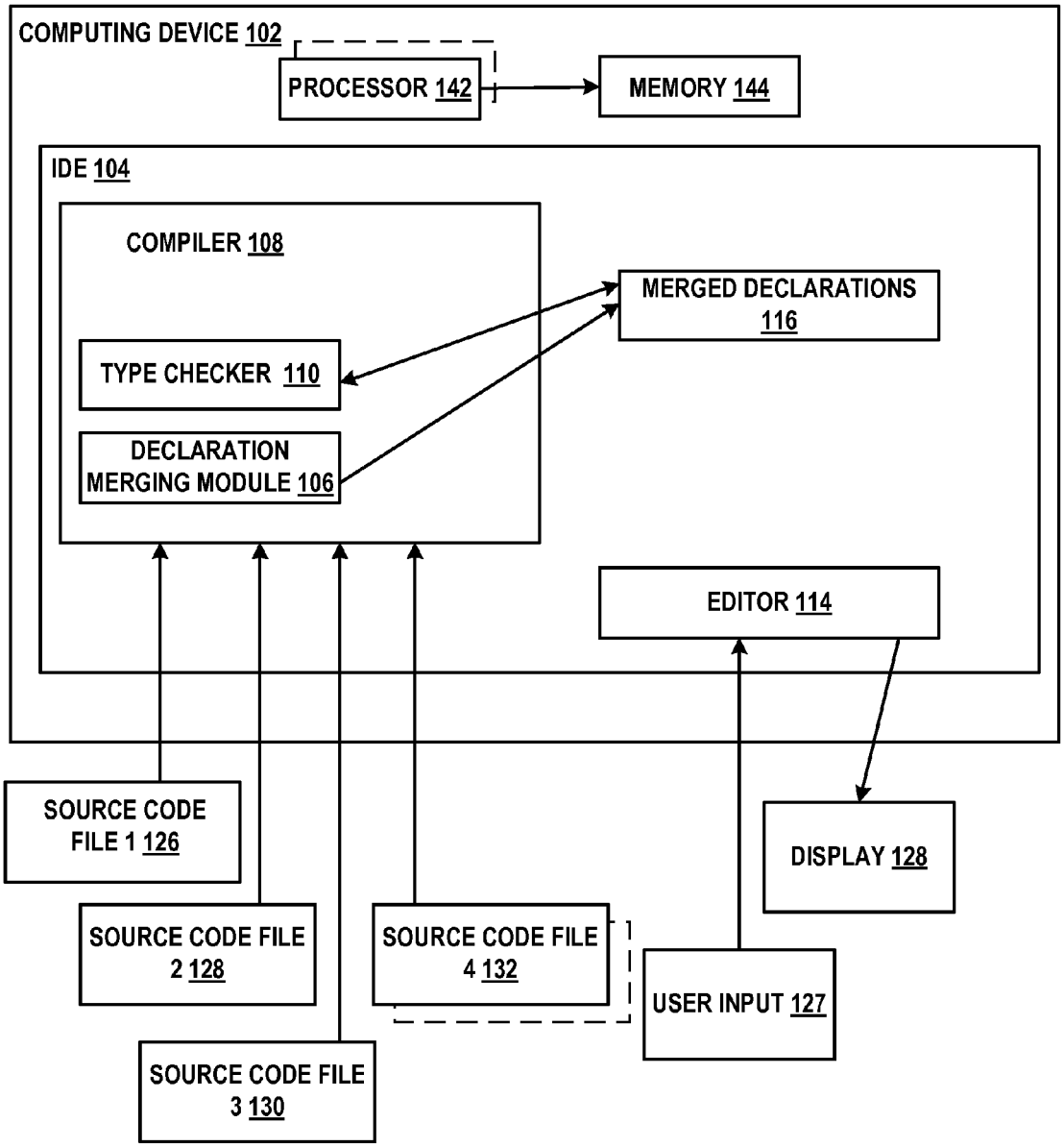
FIG. 1a illustrates an example of a system 100 that enables extension of static types in accordance with aspects of the subject matter described herein.

Dynamic type systems make it easy to extend the capabilities of a component at runtime while maintaining a consistent view of the type of the component during execution, even though the extended component may have been composed from various pieces defined by various authors. This is true both for built-in extensions and for third party plug-in extensions.

Extending the capabilities of a component is more difficult with static type systems because it is difficult to get a consistent view at compile time of something that is not there until runtime. Statically typed systems enable program development tooling that can validate that the usage of a component (such as but not limited to an object or class of objects) is correct. Typically this means that static type systems constrain the ability for types to evolve after the program is distributed and is being used by the public.

In accordance with aspects of the subject matter disclosed herein source code is statically type checked based on a set of type declarations for a component. An initial declaration may be extended by one or more additional declarations provided in one or more additional components. One or more of the additional components can be provided by one or more different, potentially independent parties as, for example, a dynamic plug-in. In accordance with aspects of the subject matter described herein, a compiler can receive source code comprising a set of declared types and type annotations, and can statically type check the source code and produce code that is executed in a dynamic runtime system. In accordance with some aspects of the subject matter described herein, the source code is written in the TypeScript language, compiled by a TypeScript compiler and JavaScript code is generated.

Typescript is a superset of JavaScript, meaning that any valid JavaScript code is valid TypeScript code. TypeScript adds additional features on top of JavaScript. TypeScript can be converted into ECMAScript 5 compatible code by the TypeScript compiler, a different approach than that taken by other known compile-to-JavaScript languages. TypeScript permits the annotation of variables, function arguments, and functions with type information, facilitating the use of tools such as auto-completion tools and enabling more comprehensive error checking than that provided by using traditional JavaScript. Libraries written in JavaScript code can be consumed by the TypeScript compiler by describing the structure of the library. When declaring the shape of a library, TypeScript allows the use of a static interface type.

In accordance with some aspects of the subject matter described herein, a separate JavaScript component of the system, potentially authored by a different individual or organization, may dynamically extend the capabilities of an existing component. For example, a plug-in or other extension may expand the capabilities of objects returned when the component is called. To capture the extension in the static type system, the type can be redeclared. Static type extensions can be maintained independently of traditional source code files (e.g., in a separate file or in a separate file type).

During compilation the original declaration and all of the static type extensions of the same type (indicated by having the same fully-qualified type name) can be merged into a single declaration for the compilation, enabling extensions to extend the capabilities of the component during runtime and enabling static type checking to take place at compile time. The static type extensions can come from different parties. Errors can be raised if incompatibilities between the original type and the extended type are detected. Alternatively, incompatible members can be removed or replaced.

Statically Extensible Types

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an integrated development environment (IDE) such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc., and a memory such as memory 144 connected to the one or more processors. System 100 can include any combination of: a compiler such as compiler 108 comprising a type checker such as type checker 110 and/or one or more modules comprising a declaration merging component, represented in FIG. 1a as declaration merging module 106.

A compiler such as compiler 108 may be a computer program or set of programs that translates text written in a (typically high-level) programming language into another (typically lower-level) computer language (the target language). The output of the compiler may be object code. Typically the output is in a form suitable for processing by other programs (e.g., a linker), but the output may be a human-readable text file. Source code is typically compiled to create an executable program but may be processed by program development tools which may include tools such as editors, beautifiers, static analysis tools, refactoring tools and others that operate in background or foreground.

A compiler 108 may comprise a .NET compiler that compiles source code written in a .NET language to intermediate byte code. .NET languages include but are not limited to C#, C++, F#, J#, JScript.NET, Managed Jscript, IronPython, IronRuby, VBx, VB.NET, Windows PowerShell, A#, Boo, Cobra, Chrome (Object Pascal for .NET, not the Google browser), Component Pascal, IKVM.NET, IronLisp, L#, Lexico, Mondrian, Nemerle, P#, Phalanger, Phrogram, PowerBuilder, #Smalltalk, AVR.NET, Active Oberon, APLNext, Common Larceny, Delphi.NET, Delta Forth .NET, DotLisp, EiffelEnvision, Fortran .NET, Gardens Point Modula-2/CLR, Haskell for .NET, Haskell.net, Hugs for .NET, IronScheme, LOLCode.NET, Mercury on .NET, Net Express, NetCOBOL, OxygenScheme, S#, sml.net, Wildcat Cobol, X# or any other .NET language. Compiler 108 may comprise a JAVA compiler that compiles source code written in JAVA to byte code. Compiler 108 can be any compiler for any programming language including but not limited to Ada, ALGOL, SMALL Machine Algol Like Language, Ateji PX, BASIC, BCPL, C, C++, CLIPPER 5.3, C#, CLEO, CLush, COBOL, Cobra, Common Lisp, Corn, Curl, D, DASL, Delphi, DIBOL, Dylan, dylan.NET, eC (Ecere C), Eiffel, Sather, Ubercode, eLisp Emacs Lisp, Erlang, Factor, Fancy, Formula One, Forth, Fortran, Go, Groovy, Haskell, Harbour, Java, JOVIAL, LabVIEW, Nemerle, Obix, Objective-C, Pascal, Plus, ppC++, RPG, Scheme, Smalltalk, ML, Standard ML, Alice, OCaml, Turing, Urq, Vala, Visual Basic, Visual FoxPro, Visual Prolog, WinDev, X++, XL, and/or Z++. Compiler 108 can be a compiler for any typed programming language.

Type checker 110 can be a static type checker that type checks at compile time. Compiler 108 can include one or more modules comprising a declaration merging component represented in FIG. 1a as declaration merging module 106 that enables extension of static types by merging declarations and static type extensions as described herein. Declaration merging module 106 can be a part of a parser (not shown), part of a compiler 108, as illustrated in FIG. 1a, or can be a separate entity, plug-in, or add-on (not shown). It will be appreciated that modules such as for example, declaration merging module 106 that enables extension of static types, can be loaded into memory 144 to cause one or more processors such as processor 142, etc. to perform the actions attributed to declaration merging module 106. System 100 can include any combination of one or more of the following: an editor such as but not limited to editor 114, a display device such as display device 128, and so on. Editor 114 can receive source code such as one or more of: source code file 1 126, source code file 2 128, source code file 3 130, source code file 4 132, etc. Editor 114 can receive user input such as user input 126. Results can be displayed on display device 128. For example, in response to receiving a reference to a static type, the reference can be referred to the model of the type derived from the merged declarations. Other components well known in the arts may also be included but are not here shown.

A compiler such as compiler 108 can receive source program code in one or more files. The one or more files can be provided by one or more parties who may independently develop the source code provided in the one or more files. For example, compiler 108 may receive one or more source code files such as source code file 1 126, source code file 2 128, source code file 3 130, source code file 4 132 and so on. Source code file 1 126 may represent a source code file that defines a type. One or more of the other source code files may represent a source code file that defines an extension to the type defined in source code file 1 126. A declaration merging module 106 may receive multiple declarations of a type and merge the declarations into a merged declaration such as merged declarations 116. Type checker 110 can use the merged declarations 116 to perform static type checking on the source code during compilation. The type checked source code can be compiled or interpreted to produce executable code as known in the art.

A compiler such as compiler 108 can receive a program such as, for example, a TypeScript program. In accordance with aspects of the subject matter disclosed herein, a TypeScript program may include one or more source files. A source file can be an implementation source file. A source file can be a declaration source file. A source file can be a file that includes static type extensions of a type such as a static interface type. Static type extension source files can be distinguished by using a different name for the source file. For example, the initial declaration of a type such as the interface type for the "Widget" interface may reside in a file called Widget.d.ts and an extension of the "Widget" interface type may reside in a source file called WidgetExtension.d.ts. Static type extensions can use the same syntax as the original declaration. When a type is declared multiple times within a compilation, the compiler can treat the type as the union of all the members contributed by all the declarations.

When the program is compiled, all of the program's source files are processed together in accordance with aspects of the subject matter described herein. Declarations and static type extensions in different source files or in different parts of the compilation can be merged together. In accordance with aspects of the subject matter disclosed herein, a static interface type can be used to declare the structure or signature of a library. The ability to statically describe the structure of a program module is provided by the programming language. For example, in the following code:

```
interface Widget {
    text(content: string);
}
``` declares an interface "Widget" that describes a type that has a function "text" that takes a parameter "content" of type "string".

The code:

```
interface WidgetStatic {
    get(url: string, callback: (data: string) => any);
    (query: string): Widget;
}
declare var $: WidgetStatic;
``` declares a second interface "WidgetStatic", which has a method "get" which takes two parameters. The first parameter is of type "string". The second parameter is of a "function" type that takes a string and returns a result of any type. The line:

(query: string): Widget;

is a call signature. If something of type "WidgetStatic" is invoked as if it were a function, with an argument of "string" type, an object of "Widget" type would be returned. The line:

declare var $: WidgetStatic;

indicates that the method "get" from "WidgetStatic" can be called with a string parameter and a callback function parameter or $(<string>)

can be entered to call $ as a function to get something of "Widget" type back.

A separate component of the system, potentially authored by a different individual or organization, may dynamically extend the shape of a library by redeclaring the interface. For example, a plug-in or extension may expand the capabilities of the "Widget" interface to add a "somethingElse" capability, effectively changing the "Widget" type as in the example code reproduced below. To capture this in the static type system, an interface can be redeclared or extended by a static type extension. For example, the "Widget" interface above can be redeclared, in a separate file such as in a file WidgetExtension.d.ts, as follows:

```
interface Widget {
    somethingElse( ): string;
}
```

In this code fragment, "Widget" is redeclared and another method "somethingElse" which returns a string is added.

Similarly, "WidgetStatic" can be redeclared as follows:

```
interface WidgetStatic {
    somethingElseVersion: number;
}
``` which adds a property of type "number" to the "WidgetStatic" interface. The compiler can recognize the two separate declarations for "Widget" at compile time and can combine the two declarations into a model of a type for "Widget". Similarly, the compiler can recognize the two separate declarations for "WidgetStatic" at compile time and combine the separate declarations for "WidgetStatic" into a model of a type for "WidgetStatic". In the code above, "Widget" and "WidgetStatic" are redeclared with new members, which will then augment the previous declarations. For example, in the previous example, "$" will have a new member, "somethingElseVersion". It will be appreciated that the interface "Widget" is declared once in the Widget.d.ts file and again in the WidgetExtension.d.ts. These two declarations of the "Widget" interface can be merged in the internal model of the compiler, effectively extending the capabilities of the original "Widget" interface. This enables program development tools such as completion lists, etc. to display all the capabilities for the redeclared interface.

The file that redeclares the interface can be maintained independently of the original declaration file, alongside the similarly separately maintained extension file. Interface extension files can augment the type during compilation. An error can be produced if incompatibilities between the interfaces are detected. Alternatively, incompatible members can be removed or replaced, as the syntax explicitly directs. Type extension as described above can be implemented by merging the original declarations and static type extensions of that particular type.

Now suppose a first source file Widget.d.ts includes the original declaration of the "WidgetStatic" interface type:

```
interface Widget {
    addClass: string;
}
interface WidgetStatic {
    ( ): Widget;
}
```

Figure 1B:
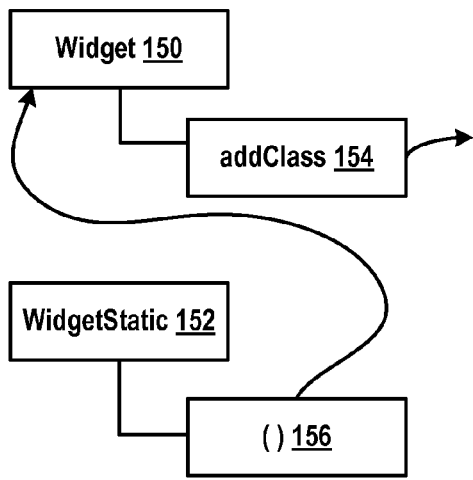
FIG. 1b illustrates a representation of an initial declaration of an interface type in accordance with aspects of the subject matter disclosed herein.

A representation of this declaration is illustrated in FIG. 1b.

In this code fragment, the two interfaces "Widget" 150 and "WidgetStatic" 152 are declared. "Widget" 150, has one member, "addClass" 154, of type "string". "WidgetStatic" 152 has a call signature 156 that returns a value of the type "Widget". Now suppose a second source file, WidgetExtension.d.ts defining an extension to the "WidgetStatic" interface includes the following code:

```
interface Widget {
    Draggable: Dragging;
}
interface WidgetStatic {
    dragConfig: object;
}
interface Dragging {
    duration: number;
```

Figure 1C:
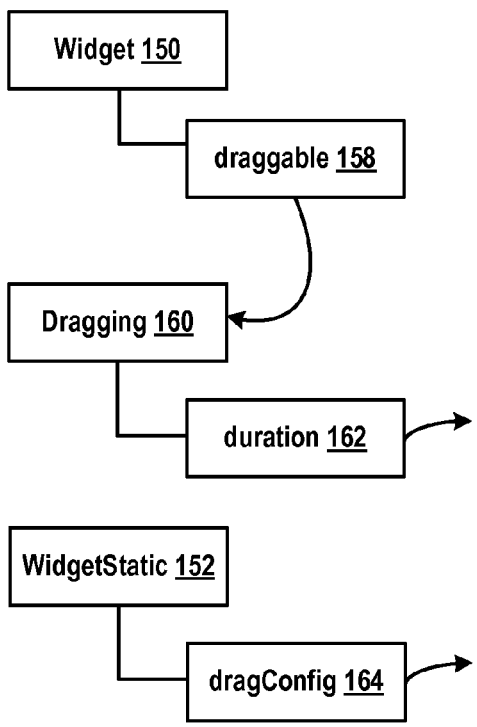
FIG. 1c illustrates a representation of an extension to the initial declaration of the interface type represented in FIG. 1b in accordance with aspects of the subject matter disclosed herein.

A representation of the "Widget" and "WidgetStatic" interfaces are illustrated in FIG. 1c. The interface "Widget" 150 is redeclared to contain a new member, "Draggable" 158, of type "Dragging" 160. The interface "WidgetStatic" 152 is redeclared to contain a new member, "dragConfig" 164, of type "object".

Figure 1D:
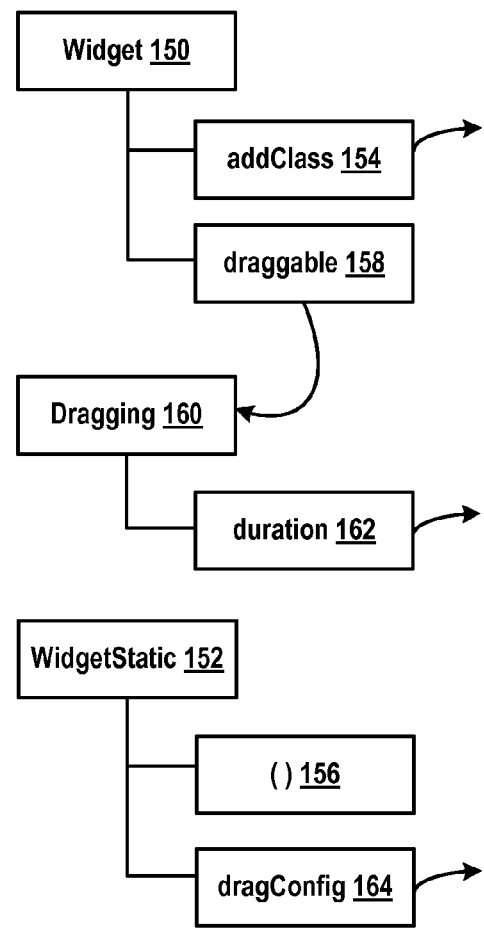
FIG. 1d illustrates a representation of a merging of the initial declaration of the interface type of FIG. 1b and the extension to the interface type of FIG. 1c in accordance with aspects of the subject matter disclosed herein.

When the source code including the Widget.d.ts and WidgetExtension.d.ts files are compiled, the definitions of "Widget" and "WidgetStatic" are merged. A representation of the merged files is illustrated in FIG. 1d. The types "Widget" 150 and "WidgetStatic" 152 from FIG. 1b and FIG. 1c are then merged to include all members added in both declarations. "Widget" 150 includes the members "addClass" 154 and "Draggable" 158. Member "Draggable" 158 is of type "Dragging" 160 which has a property "duration" 162 of type "number". "WidgetStatic" 152 has a call signature 156 and a member "dragConfig" 164. It will be appreciated that although FIG. 1d illustrates the merging of two declaration files, any number of declaration files can be merged to generate a merged declaration for the type. Statically extensible interface types are static types which can be extended using additional declarations in the same compilation. The described paradigm supports static type checking of dynamic plug-in models using statically extensible interface types. It will be appreciated that although described in the context of the TypeScript and JavaScript languages, the subject matter applies to any statically typed programming language compiling to a dynamically typed runtime environment. This allows types to be extended independently of the time, location or file of their creation, allowing for more flexible representations of types.

Figure 2:
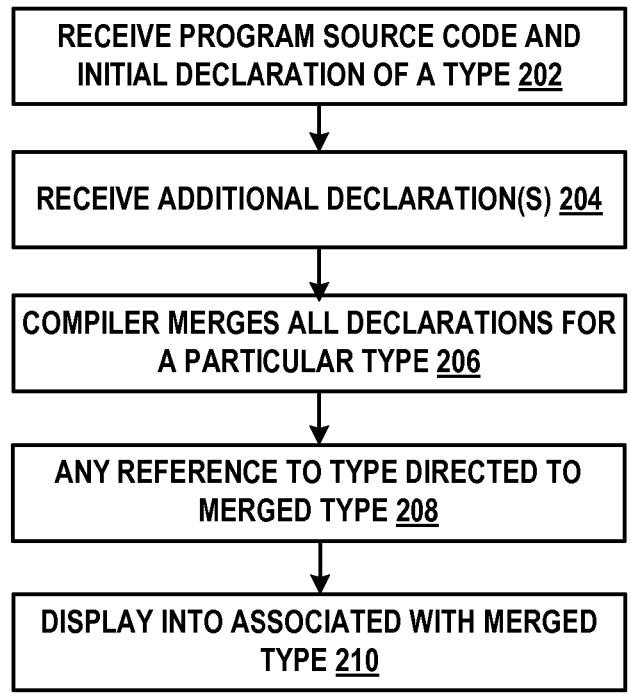
FIG. 2 illustrates an example of a method 200 that enables extension of static types in accordance with aspects of the subject matter disclosed herein.
Figure 2:

FIG. 2 illustrates an example of a method 200 for static extension of types in accordance with aspects of the subject matter disclosed herein. The method described in FIG. 2 can be practiced by a system such as but not limited to the one described with respect to FIG. 1a and for which an example was provided in FIGS. 1b-1d. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 program source code can be received. Program source code can comprise an initial declaration for a particular type. The program source code can be received from a first source. A source can be a programming organization, a company or other business organization, a programmer or any source. At operation 204 a second declaration (e.g., a static type extension) for the type can be received from a second source. The second source can be the same source as the first source or can be a different source. One or more addition static type extensions of the type can be received from other sources. The one or more additional sources can be the same source as the first source, the same source as the second source or can be a different source. At operation 206 the compiler can generate a merged declaration for the type. At operation 208, any references to the type are directed to the merged internal representation of the type. Type checking can be performed based on the merged internal representation of the type. At operation 210 in response to receiving a reference to the type, information associated with the merged representation of the type can be displayed.

Example of a Suitable Computing Environment

Figure 3:
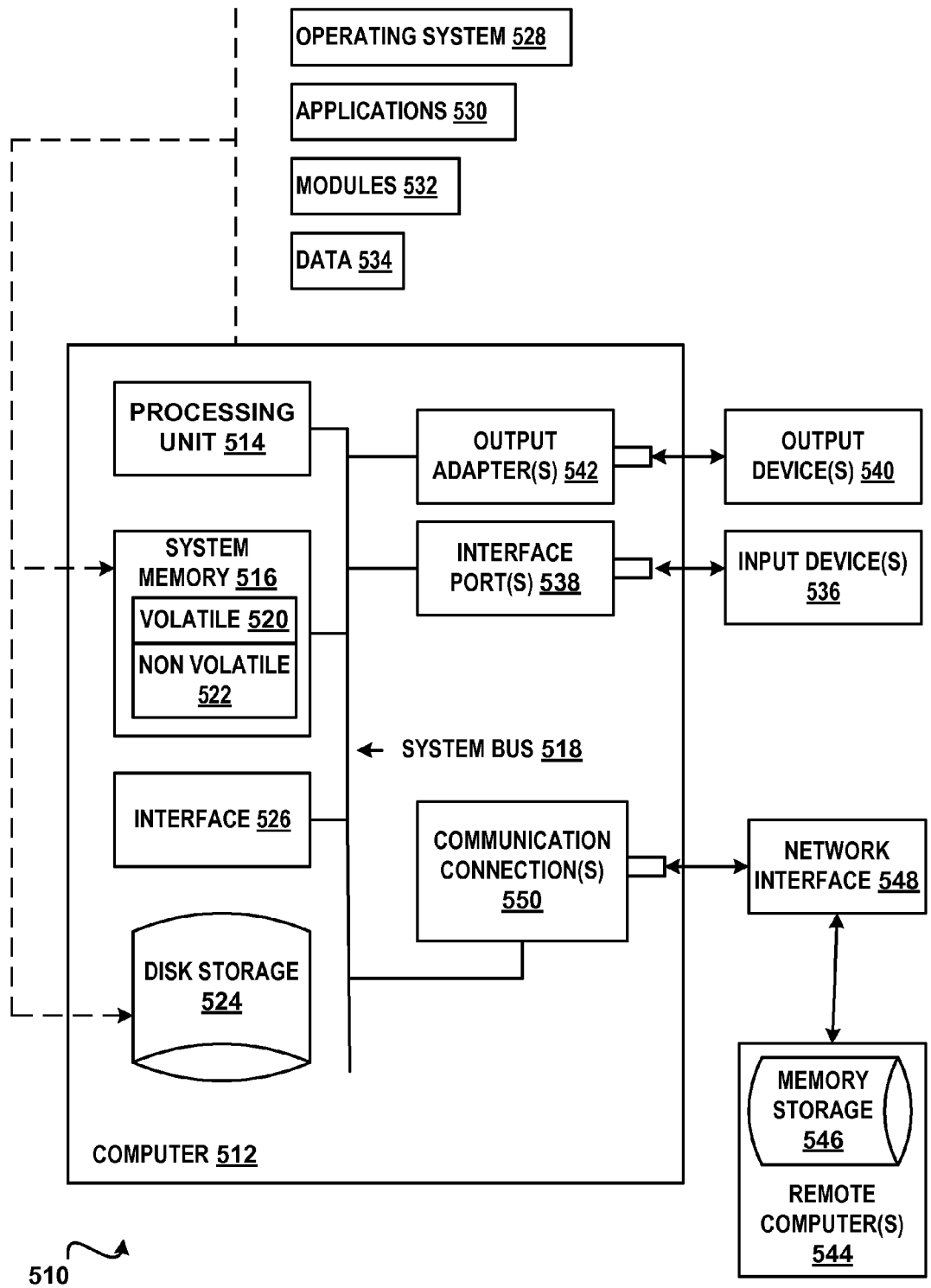
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
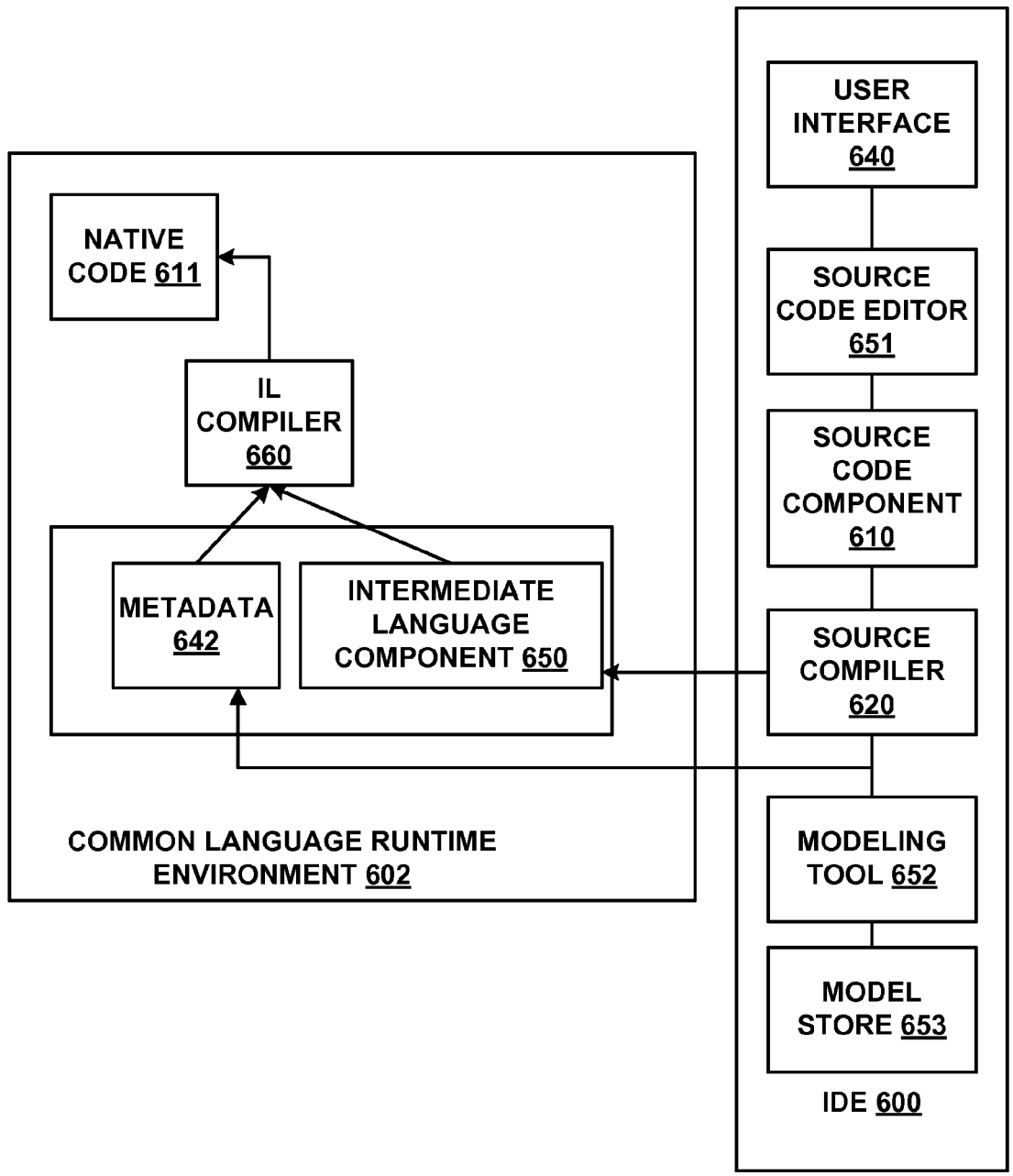
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving by a processor of a software development computer, program source code comprising an initial declaration for a static type of a component in a first file;
   receiving program source code comprising at least one additional declaration comprising a static type extension for the static type of the component in a second file, where the at least one additional declaration extends capabilities of the component at runtime;
   merging the initial declaration for the static type of the component in the first file with the at least one additional declaration for the static type of the component in the second file to create a merged static type declaration;
   using the merged static type declaration for static type checking during compilation.

2. The method of claim 1, wherein the first file is created by a first source and the second file is created by a second source independent of the first source.

3. The method of claim 1, wherein the static type comprises a static interface type.

4. The method of claim 1, wherein the program source code is written in TypeScript.

5. The method of claim 1, wherein the initial declaration and the at least one additional declaration use a common syntax.

6. The method of claim 1, wherein the initial declaration uses a first syntax and the at least one additional declaration use a second syntax distinct from the first syntax.

7. A system comprising:
   at least one processor: and
   a memory connected to the at least one processor; and
   the at least one processor configured to:
   receive program source code comprising an initial declaration for a static type of a component in a first file from a first source;
   receive program source code comprising at least one additional declaration for the static type of the component in a second file from a second source, wherein the at least one additional declaration extends capabilities of the component at runtime; and
   in response to receiving a reference to the static type of the component, display information associated with a merged representation of the static type of the component, the merged representation of the static type of the component including the initial declaration and the at least one additional declaration.

8. The system of claim 7,
   wherein the at least one processor is configured to:
   receive program source code comprising TypeScript program source code.

9. The system of claim 7,
   wherein the at least one processor is configured to:
   merge the initial declaration and the at least one additional declaration for the static type of the component to create a merged declaration for the static type.

10. The system of claim 7, wherein the static type comprises a static interface type.

11. The system of claim 9, wherein the at least one processor is further configured to:
    perform static type checking on the program source code based on the merged declaration for the static type.

12. The system of claim 7, wherein the initial declaration and the at least one additional declaration use a common syntax.

13. The system of claim 7, wherein the initial declaration uses a first syntax and the at least one additional declaration use a second syntax distinct from the first syntax.

14. A device, comprising:
    at least one processor and a memory;
    the at least one processor configured to:
    perform static type checking at compilation time on program source code based on an extended static interface type, the extended static interface type comprising an initial static type defined by an initial declaration provided in a first source code file merged with at least one extension declaration provided in at least one additional source code file for the initial static type, wherein the at least one extension declaration extends capabilities of a component of the program source code at runtime.

15. The device of claim 14, wherein the at least one processor is further configured to:

receive the first source code file, the first source code file originating from a first source and receive the second source code file, the second source code file originating from a second source that is not the first source.

16. The device of claim 14, wherein the at least one processor is further configured to:

receive the first source code file, the first source code file defining the initial static type using a first syntax and receiving the second source code file, the second source code file defining an extension to the static type using the first syntax.

17. The device of claim 14, wherein the at least one processor is further configured to:

receive the first source code file, the first source code file defining the initial static type using a first syntax and receiving the second source code file, the second source code file defining an extension to the static type using a second syntax distinct from the first syntax.

18. The device of claim 14, wherein the at least one processor is further configured to:

receive a plurality of program source code files, wherein a first file of the plurality of source code files defines a first capability of a static interface and wherein a second file of the plurality of source code files defines a second capability of the static interface.

19. The device of claim 14, wherein the at least one processor is further configured to:

receive program source code written in TypeScript.

20. The device of claim 14, wherein the at least one processor is further configured to:

model a dynamic plug-in system extensibility capability in a static type system.

* * * * *